(12) United States Patent
Vallino

(10) Patent No.: US 8,753,074 B2
(45) Date of Patent: Jun. 17, 2014

(54) ASPIRATOR INSERT FOR A BOUNDARY LAYER IN A FLUID, A WALL AND A COMPRESSOR EQUIPPED WITH SAID INSERT

(75) Inventor: Frederic Vallino, Seraing (BE)

(73) Assignee: Techspace Aero S.A. (BE)

( * ) Notice: Subject to any disclaimer, the term of this patent is extended or adjusted under 35 U.S.C. 154(b) by 885 days.

(21) Appl. No.: 12/888,708

(22) Filed: Sep. 23, 2010

(65) Prior Publication Data

US 2011/0076138 A1   Mar. 31, 2011

(30) Foreign Application Priority Data

Sep. 28, 2009  (EP) ..................................... 09171509
Nov. 4, 2009   (EP) ..................................... 09175028

(51) Int. Cl.
*F01D 17/08*   (2006.01)
*F01D 25/24*   (2006.01)
*F04D 27/02*   (2006.01)

(52) U.S. Cl.
USPC ................................ 415/144; 415/108; 415/1

(58) Field of Classification Search
USPC ......... 415/108, 145, 168.1, 168.2, 168.4, 144
See application file for complete search history.

(56) References Cited

U.S. PATENT DOCUMENTS

| 4,540,335 A * | 9/1985 | Yamaguchi et al. ........... 415/129 |
| 2003/0189067 A1 * | 10/2003 | Stull et al. ...................... 222/494 |
| 2004/0060280 A1 * | 4/2004 | Malmborg ..................... 60/226.1 |

FOREIGN PATENT DOCUMENTS

| CA | 2199875 | 4/1996 | | |
| DE | 20114702 | 1/2002 | | |
| EP | 1544524 A1 | 6/2005 | | |
| EP | 1832755 A2 | 9/2007 | | |
| EP | 1898067 A2 | 3/2008 | | |
| FR | 1012339 A | 7/1952 | | |
| FR | 2916475 A1 * | 11/2008 | ............. | F01D 17/10 |
| GB | 801771 * | 9/1958 | ............. | F04D 27/02 |
| GB | 1357016 | 6/1974 | | |
| GB | 2158879 A | 11/1985 | | |

OTHER PUBLICATIONS

Search Report dated Aug. 26, 2010 for EP09175028.

* cited by examiner

*Primary Examiner* — Nathaniel Wiehe
*Assistant Examiner* — Aaron Jagoda
(74) *Attorney, Agent, or Firm* — James E. Walton; Richard G. Eldredge

(57) ABSTRACT

A passive leakage device for an axial turbomachine, more particularly for a low-pressure compressor of an axial turbomachine, is adapted to reduce and/or eliminate the surging phenomenon within the machine. The passive leakage device includes an insert having a general cylindrical shape with a flange at one end and a bottom or membrane at the other end. The membrane comprises two cross-shaped notches, the notches being adapted to enable a deformation of the membrane under a pressure exceeding a predetermined threshold, so as to allow a leakage to go through the membrane. Several inserts are arranged through the wall of a compressor casing, distributed over one or several circumferences of the casing, facing one or several rows of rotor blades. In the case of a double-flow turbomachine, such as a jet engine, the beak for separating the primary and secondary flows is used to form a chamber for communication between the inserts and for compensation with the pressure present in the secondary flow.

20 Claims, 2 Drawing Sheets

FIG 1
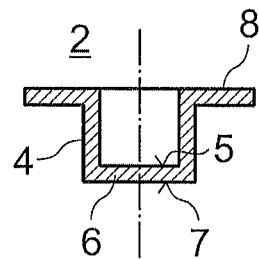
FIG 2 FIG 3
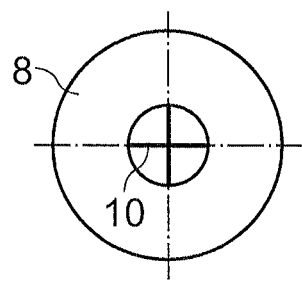 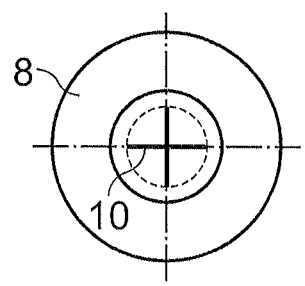
FIG 4
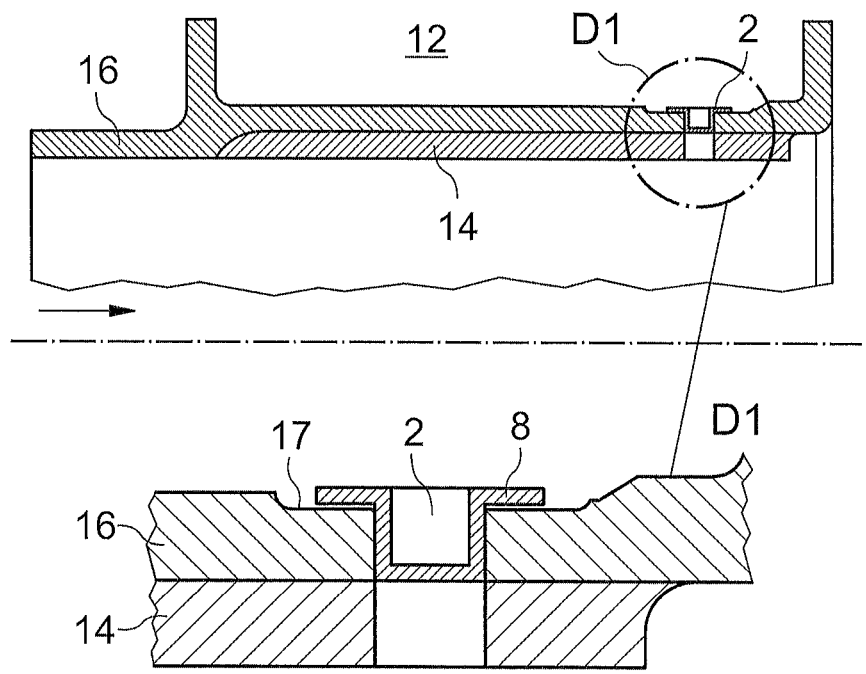

ASPIRATOR INSERT FOR A BOUNDARY LAYER IN A FLUID, A WALL AND A COMPRESSOR EQUIPPED WITH SAID INSERT

This application claims priority under 35 U.S.C. §119 to European Patent Application No. 09171509.4, filed 28 Sep. 2009, and to European Patent Application No. 09175028.1, filed 4 Nov. 2009, both of which are incorporated herein by reference for all purposes.

BACKGROUND

1. Field of the Application

The invention relates to a leakage device for a turbomachine, more particularly for an axial turbomachine compressor, more particularly still, for an axial low-pressure compressor, the leakage device having, as an object, that of reducing, eliminating, or controlling the surging phenomenon which can occur in the area of the flow in the machine at certain operation speeds. The invention also relates to a wall equipped with at least one said leakage device, to a compressor equipped with said wall, as well as, to a process for reducing and suppressing a surging phenomenon in an axial compressor.

2. Description of Related Art

Surging is a fundamental phenomenon peculiar to dynamic compressors. The latter are characterized in that compression is achieved by power transfer in the fluid set in motion in rows of blades. Axial and centrifugal compressors belong to this category of turbomachines. Similar to the stalling phenomenon of an airplane wing which thus loses its lift, the fluid flow through the compressor can stall, which prevents the fluid from being "pushed". Indeed, the compressor being connected to two circuits at different pressure, the high-pressure capacity of the discharge empties in the low-pressure capacity of the suction by a counter-current flow-rate in the compressor. Surging is the general aerodynamic instability of the compressor in its environment during operation, mostly at low flow-rate. When the discharge circuit has been sufficiently emptied in the suction, the compressor finds new operating conditions allowing the flow-rate to be restored in the right direction until a new instability cycle starts again. These large flow-rate fluctuations are called surges because of the nature of this relaxation oscillations phenomenon. The sudden flow-rate inversion is similar to a shock and its mechanical consequences can be disastrous, such as, for example, the breaking of the blades on the axial compressors.

Specific protection means must be installed on the machines to preserve their integrity and maintain their performance over time. These means are all the more complex because the largest range possible of the flow-rate is always desired for the operation of the machine in order to adapt the power in a permanent, economical, and flexible manner while maintaining the consumption as low as possible.

Numerous protection means against surging have been developed in the past. Most of them consist in generating a controlled leakage in the area of the wall of the compressor casing in the area of the end of a row of rotor blades.

The patent document GB 801,771 discloses a similar device consisting, essentially, of a series of movable plugs arranged on the perimeter of the compressor casing of an axial turbomachine, facing holes made in the casing. The movable plugs are connected in a sealed manner with a flexible membrane whose rear surface forms, with a wall element, a chamber for controlling the plugs. The front surface of the membrane forms a leakage chamber common to the different plugs and in connection with a valve enabling the leakage to be connected to the atmosphere or to a diffuser downstream of the compressor. This device has the advantage of being controllable, but the consequence of this measure is to require an efficient control device, which increases the complexity and the cost of the device. Furthermore, the construction itself of the movable plugs serving as leakage valves is rather complex and requires a lot of care, in the precision of execution as well as in terms of maintenance (replacement of the membranes, checking that the plugs correctly slide in their guides, etc).

The patent document GB 1,357,016 discloses a leakage device controlled according to a general principle similar to that of the previous document, namely, holes or openings made in the wall of the compressor casing, of an axial turbomachine being blocked up or kept free by the application of a membrane put under pressure by connection to the compressor. The membrane is displaced by means of a cylindrical wall surrounding the cylindrical casing of the compressor perpendicularly to the openings. The membrane is fixed to this cylindrical wall so that the displacement of this wall in parallel to the casing wall displaces the membrane by rolling onto itself, enabling the openings to be opened or blocked up. Compared to the teachings of the previous document, this device has the advantage of being able to control the leakage but requires complex and costly control means.

The patent document GB 2,158,879 A discloses an active leakage device, that is, controlled. It essentially consists of a valve put on a discharge circuit in the vicinity of a duct connecting an opening made in the casing of an axial turbomachine compressor to the discharge circuit. The valve is controlled by an actuator which is also controlled. Compared to the teachings of the previous documents, this device has the advantage of making it possible to control the leakage but requires complex and costly control means.

The active leakage devices such as described hereinabove generally consist in withdrawing a variable flow-rate of air according to a defined program. A set of adjustments must then be defined and controlled by the FADEC (Full Authority Digital Engine Control). The FADEC is a system which lies in a calculator and control and command peripherals being interfaced between the cockpit and the aircraft engine. These adjustments being pre-defined, the functioning is not optimal, in particular during the transients.

The patent document EP 1,898,067 A discloses a passive leakage device for a jet engine compressor. The device creates a permanent leakage with an upstream recirculation, which results in losses and a non-optimal use of the compressor. The surge adjustment requirement thus causes a permanent degradation of the performances of the compressor, due to the presence of a leakage even in the absence of any penalizing phenomenon.

Although great strides have been made in the area of axial compressors, many shortcomings remain.

DESCRIPTION OF THE DRAWINGS

FIG. 1 is a cross-sectional view of a leakage device according to the invention.

FIG. 2 is a top view of a leakage device according to the invention.

FIG. 3 is a bottom view of a leakage device according to the invention.

FIG. 4 is a cross-sectional view of an axial compressor wall comprising a leakage device according to the invention.

DETAILED DESCRIPTION OF THE PREFERRED EMBODIMENT

Figure 5:
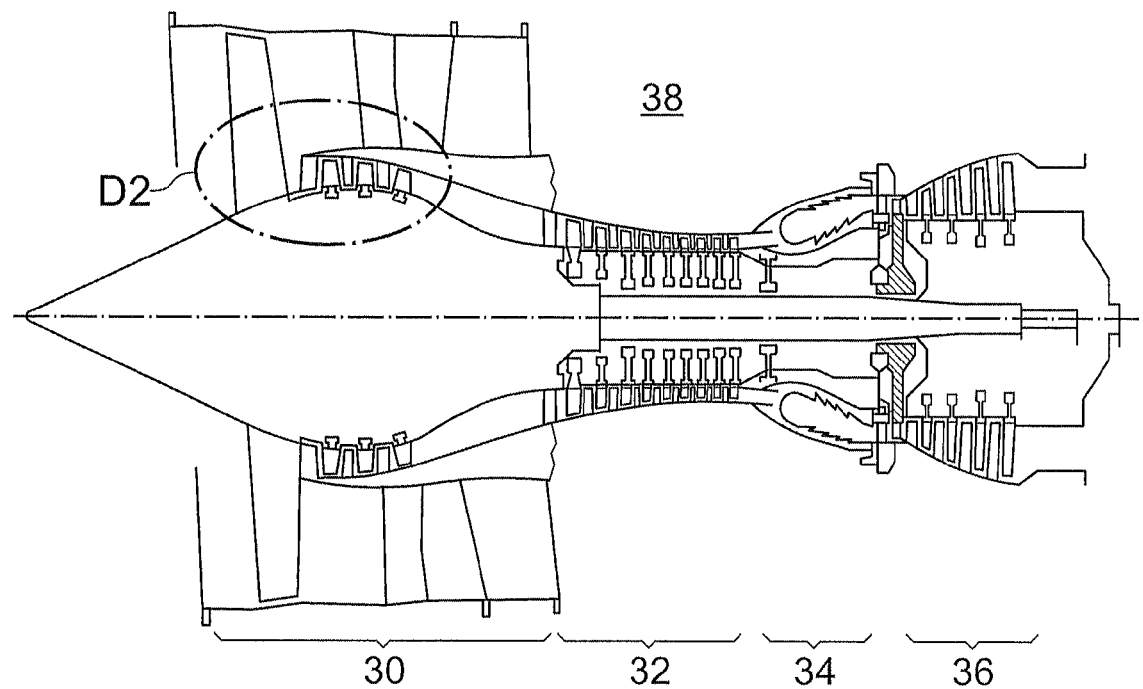
FIG. 5 is a schematic view of a turbojet equipped with a low-pressure compressor provided with at least one leakage device according to the invention. The detail D2 shows the separation beak between the primary flow and the secondary flow of the turbojet and comprising two walls equipped with several leakage devices according to the invention.
Figure 5:
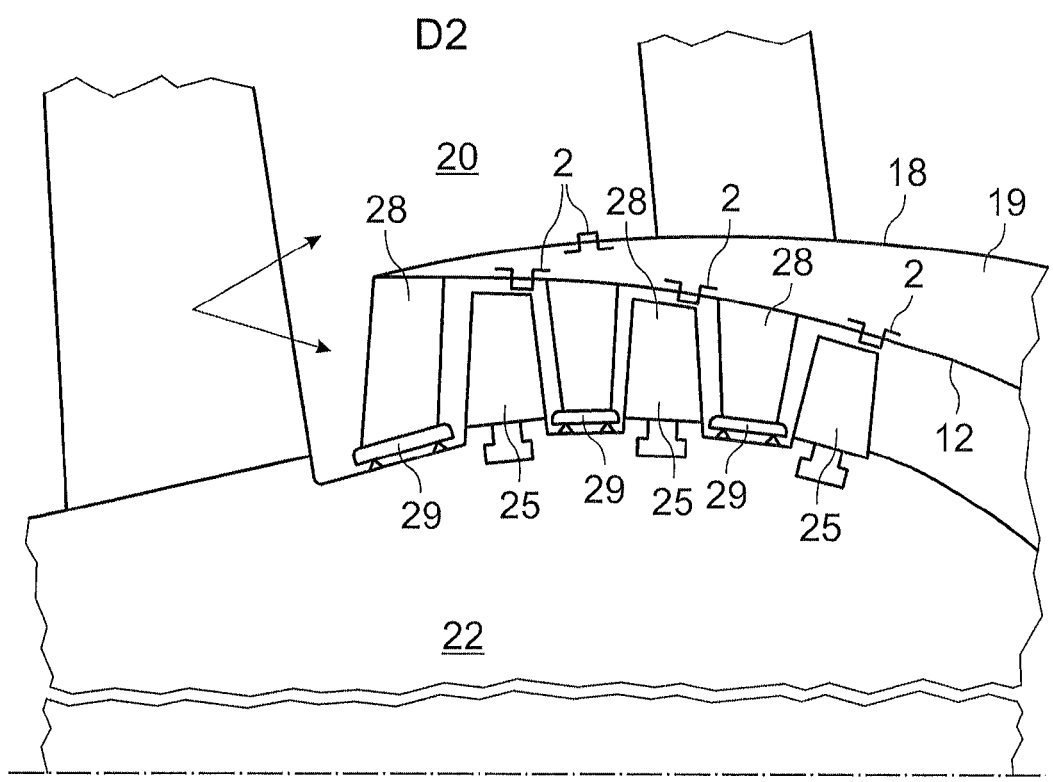

The present application discloses a leakage device for turbomachines, more particularly axial compressors, adapted to limit and/or stop a surge phenomenon, thereby overcoming at least one of the above-mentioned drawbacks.

The present application includes a device for a leakage toward a leakage channel for a wall delimiting a fluid stream in motion in a turbomachine, comprising a hollow insert adapted so as to be arranged through the wall, the insert comprising a membrane whose outer surface defines the fluid stream and the inner surface is in contact with the leakage channel, the membrane comprising at least one notch; the membrane being made of a material and having a geometry such that it is adapted to deform near the notch in the presence of a pressure difference between its inner and outer surfaces. It is very easy to manufacture, implement, and maintain such a leakage device. Furthermore, it enables a calibrated and intermittent leakage to be created, which means that it occurs only when necessary, at very precise locations of the turbomachine.

According to an advantageous embodiment of the present application, the membrane is made in the same material as the insert and is unitary with the latter. This embodiment is the simplest and the most economical.

According to another advantageous embodiment of the present application, the membrane comprises two cross-shaped notches, the two notches preferably being perpendicular. Diverse shapes of notches are possible. The aforementioned shape is simple and easy to make and allows for an interesting pressure-flow-rate characteristic curve, even despite the intrinsically high rigidity of the material of the membrane.

According to yet another advantageous embodiment of the present application, the insert is generally cylindrical along a longitudinal axis and the membrane is arranged at an end of the cylindrical portion, generally perpendicular to its longitudinal axis, and in a sealed manner with respect to the cylindrical portion. This embodiment is the simplest and the most economical.

According to yet another advantageous embodiment of the present application, the insert comprises a flange at the end of its cylindrical part which is opposite to that comprising the membrane. The flange has a significant contact surface with the surface of the wall, and thereby provides for an efficient attachment, for example by gluing.

According to yet another advantageous embodiment of the present application, the membrane material is a shape memory alloy or a polymer. Shape memory alloys present the usual advantages of the metal materials for this type of implementation, and, furthermore, a super elasticity that can reach 10% (that is, without permanent deformation).

The present application also includes a turbomachine wall delimiting a fluid stream in motion equipped with at least one device for a leakage toward a leakage channel, and where the leakage device is such as described hereinabove.

According to an advantageous embodiment of the present application, the leakage device is arranged so that the outer surface of the membrane is flush with the adjacent surface of the wall, the adjacent surface of the wall preferably being provided with a layer of abradable material. A through hole is made in the wall and the abradable surface whereas, once the insert is set in place in the through hole, the outer surface of the membrane is flush with the surface of the wall and not that of the abradable membrane as the latter is adapted to be potentially eroded by the rotation of the rotor blades.

According to another advantageous embodiment of the present application, the leakage device is arranged so that its longitudinal axis is approximately perpendicular to the wall.

According to yet another advantageous embodiment of the present application, the wall comprises a series of leakage devices distributed over one or several circumferences of the wall.

According to yet another advantageous embodiment of the present application, the wall is a stator wall of a compressor, delimiting the outer envelope of the fluid stream accelerated by a row of rotor blades of the compressor, the leakage device or devices being advantageously arranged with respect to the ends of the row of rotor blades.

According to yet another advantageous embodiment of the present application, the wall is an inner cylinder of a row of stator blades of a compressor, forming a rectifier stage. Indeed, it can be interesting to provide for a leakage device in the area of the inner envelope of the fluid stream of the compressor. In this case, it is recommended to provide for the inserts to be in the area of the inner cylinder with the outer surface of the membrane being flush with the outer surface of the cylinder.

The invention also includes a multi-stage compressor of a double-flow turbomachine, comprising a first wall delimiting the outer envelope of the fluid stream of the primary flow going through the compressor and a second wall delimiting the inner envelope of the fluid stream of the secondary flow and forming with the first wall a beak for separating the primary and secondary flows; the separation beak being provided with at least one leakage device for the first wall, the leakage being adapted to limit and/or stop a surging phenomenon, and wherein the first wall is such as described hereinabove and comprises several leakage devices arranged in the area of several compression stages, the separation beak forming a communication chamber of the leakage devices arranged on the first wall. This communication chamber allows for controlled air recirculation by means of different leakages calibrated among each other and, thereby, a better balance of the pressures in the compressor.

According to an advantageous embodiment of the present application, the second wall is provided with at least one insert such as described hereinabove, so as to compensate the pressure present in the communication chamber of the leakage devices arranged on the first wall. This measure makes adjusting the pressure in the communication chamber possible, and thereby allows optimizing the functioning of the positioned inserts distributed on the compressor casing.

The invention also includes a process of diminishing and suppressing a surging phenomenon in an axial compressor of a double-flow turbomachine with a first wall delimiting the outer envelope of the fluid stream of the primary flow going through the compressor and a second wall delimiting the inner envelope of the fluid stream of the secondary flow and forming with the first wall a beak for separating the primary and secondary flows; the process comprising the step consisting in arranging at least one leakage device in the area of the first wall, the leakage device or devices being such as described hereinabove; and comprising the step for providing at least one leakage device such as described hereinabove through the second wall so as to use the separation beak as a communication and compensation chamber for the leakage devices of the first wall.

The leakage device consists of an insert 2 such as shown in cross-section in FIG. 1. The insert essentially comprises a hollow cylindrical portion 4, a bottom or membrane 6 closing the cylindrical portion at one end, and a flange at the other end of the cylindrical portion. The membrane 6 has an outer surface 7 and an inner surface 5 located in the hollow portion of the insert.

The word membrane is used in this description by analogy with an elastic membrane, knowing that the elasticity of the membrane described will remain minimal, albeit quite real, in the manner of a real membrane that is slightly elastic. This word was chosen over the word "wall" in order to avoid any confusion with the wall delimiting the fluid stream destined to receive the insert. However, it must be understood as being similar to the word "wall", but with particular flexibility properties.

A top view of the insert is shown in FIG. 2 and a bottom view is shown in FIG. 3. The membrane 6 has two cross-shaped notches 10. These two notches are made through the entire thickness of the membrane 6. The latter is made of the same material as the cylindrical portion 4 and flange 8. It is also unitary with the cylindrical portion 4 and the flange 8, which means that these three parts of the insert are made by forming a single piece.

One purpose of these two notches 10 is to allow a leakage to pass through when the pressure difference between the two surfaces 5 and 7 of the membrane exceeds a certain value, while being leakproof or quasi-leakproof when this pressure difference is not reached. In practice, the insert 2 is made in one piece and of a chosen material such as, for example, a polymer or a shape memory alloy (SMA) or shape memory material. Shape memory alloys are alloys having several unique properties among metal materials: the capacity to "remember" an initial shape and to return to it even after a deformation, the possibility of alternating between two previously memorized shapes when temperature varies around a critical temperature, and a super-elastic behavior allowing for elongations without permanent deformation greater than those of other metals (up to 10%). Among the main shape memory alloys, one can find a great variety of nickel and titanium alloys as main components, with almost equal proportions, such as, for example, nitinol.

The insert can comprise only one notch, two notches, or more, depending on the performance characteristics sought. The embodiment of two notches crossed at 90° in FIGS. 2 and 3 is given only by way of example. Indeed, a simple straight notch would be possible, which would make the flow-rate/pressure characteristic curve flatter (with the abscissa representing pressure and the ordinate representing flow-rate). Conversely, one could make a series of crossed notches, for example 4 notches crossing at their center and uniformly distributed with a 45° angle between two nearby axes. In this case, the flow-rate/pressure curve would have a greater slope, thus expressing a greater variability of the flow-rate with the pressure when the latter has exceeded the critical threshold for opening the insert.

The inserts are designed to open when the pressure difference between the inner surface 5 and the outer surface 7 of the membrane 6 exceeds a certain threshold. This threshold will be determined as a function of the application, which means as a function of the machine to which the inserts are applied, and more particularly as a function of the location of the inserts. Indeed, the pressure present in the compressor progressively increases from the first compression stage to the last. The inserts typically open for a pressure difference ranging between 0.25 and 5, more particularly from 0.5 to 3 for the low-pressure compressors. The inserts can also be used for high-pressure compressors. In this case, considering the pressure and temperature constraints, it can be necessary to consider other materials adapted to ensure an opening at a pressure difference greater than 3 in more severe temperature conditions.

A wall of a compressor casing provided with a leakage insert such as described hereinabove is shown in FIG. 4. It is a cross-sectional view of a wall 12 forming a cylinder-shaped casing portion corresponding to a compression stage. The wall 12 comprises a web 16 provided with reinforcement ribs and whose inner surface delimitates a fluid stream axially displaced by the rotor (not shown). The web is shaped so that its inner surface has a diameter increase perpendicularly to a row of rotor blades (not shown in this figure), so as to be able to receive a layer 14 of abradable material adapted to cooperate with the ends of rotor blades. A series of inserts 2 are arranged through the web 16 along its circumference and in the vicinity of the edge of the layer of abradable material; this edge corresponds to the leakage edge of the rotor blades (the flow of fluid is represented by an arrow). The area of the casing 12 surrounded by the circle D1 is shown in more detail below the main diagram of FIG. 4. One observes that the insert is arranged by insertion into a through hole made through the web 16 and abradable layer 14. The height of the insert is such that the outer surface 7 of its membrane or bottom 6 is flush with the inner surface of the web 16 so as to remain preserved in case of wear and tear of the abradable layer 14. A spot facing 17 is made in the area of the outer surface of the web 16, centered with the through hole so as to enable the flange 8 of the insert 2 to be imbedded.

The number and the distribution of the inserts along the circumference of the casing depends upon various parameters, such as, for example, the leakage flow-rate sought as well as the characteristics of the inserts, and can by easily determined by one having ordinary skill in the art.

The inserts are typically inserted in the through holes made in the casing with a slight tightening and maintained, for example, by applying some glue, in particular between the flange 8 and the spot facing 17. The possible tightening and the choice of glue depend upon various parameters such as the desired mechanical strength, temperature conditions, and the possibility of disassembly in the context of maintenance procedures and can be easily determined by one having ordinary skill in the art.

The height of the inserts 2 corresponds approximately to the thickness of the web 16. The thickness of the latter is typically on the order of several millimeters, conventionally on the order of 3 mm. The outer diameter of the inserts 2 depends upon various parameters. In the case of FIGS. 1 to 4, the outer diameter is typically on the order of 4 mm and the thickness of the membrane 6 is on the order of 0.5 mm.

In case of a start of the surging phenomenon in the area of a row of rotor blades, the resulting pulsated flow generates pressures peaks which open the inserts arranged along the casing circumference facing the ends of the blades in question. The leakages generated by these inserts diminish or even cancel the pulsated nature of the flow and enable it to get back to a more or less constant speed. The inserts are typically in communication with the atmosphere so that the leakage flow-rate which they can create is carried out at a pressure corresponding to the atmospheric pressure multiplied by the pressure ratio at which the inserts open.

A particular design can be applied to a double-flow jet engine 38 such as shown in FIG. 5. The latter typically comprises, upstream to downstream, a low-pressure compressor 30, a high-pressure compressor 32, a combustion chamber 34, and a turbine 36. The detail D2 shows, in a simplified manner, a portion of the low-pressure compressor 30 comprising a separation beak 20 between the primary flow which goes through the compressor and the secondary flow which goes around it; these two flows being represented by a double arrow. The movable or rotor blades 25 are mounted on the rotor 22 and the stationary or stator blades are mounted on the casing. The separation beak 20 comprises a portion of the casing 12 of the low-pressure compressor, delimiting the outer envelope of the primary flow and a wall 18 delimiting the inner envelope of the secondary flow. The separation beak 20 with these two walls defines a chamber 19, referred to as the pressure chamber of reference. It must be noted that this chamber is separated from the corresponding volume (between the primary flow and the secondary flow) of the high-pressure compressor. The wall of the casing 12 comprises a series of inserts 2 distributed over several circumferences of the casing 12 in the area of different rotor stages. The outer wall 18 of the separation beak 20 further comprises one or several inserts 2 so as to allow for a leakage between the chamber 19 and the secondary flow.

When operating, the leakage inserts 2 arranged in the area of different stages of compression (and of specific characteristics) allow for intermittent and calibrated leakages only when the latter are necessary in precise locations of the compressor. The fact that these inserts communicate between each other via the chamber 19 also allows for controlled air recirculation and thereby, for better balancing the pressures inside the compressor. The presence of one or several inserts between the chamber 19 and the secondary flow makes it possible to balance the pressure of the chamber 19 with the secondary flow. This enables correlating the threshold for opening leakage inserts 2 of the compressor with the pressure present in the secondary flow.

It must be noted that the inserts hereinabove described can also be arranged through a wall delimiting the inner envelope of the fluid stream of a compressor, such as, for example, the rotor 22 or an inner cylinder 29 of a rectifier stage 28 such as shown in the detail D2 of FIG. 5.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present application is shown in a limited number of forms, it is not limited to just these forms, but is amenable to various changes and modifications without departing from the spirit thereof.

I claim:

1. An insert for use with a leakage channel associated with a wall of a turbomachine, the insert comprising:
    a hollow portion configured to be inserted through an aperture in the wall; and
    a membrane disposed at one end of the hollow portion, the membrane comprising:
        an outer surface that, along with an inner surface of the wall, defines a fluid stream within the turbomachine;
        an inner surface that is in communication with the leakage channel; and
        at least one notch;
    wherein the membrane is configured so as to deform in the vicinity of the notch in the presence of a pressure difference between the outer surface and the inner surface.

2. The insert according to claim 1, wherein the membrane is made of the same material as the insert.

3. The insert according to claim 1, wherein the membrane is unitary with the insert.

4. The insert according to claim 1, wherein the membrane comprises:
    two cross-shaped notches.

5. The insert according to claim 4, wherein the cross-shaped notches are perpendicular to each other.

6. The insert according to claim 1, wherein the insert is generally cylindrical with a longitudinal axis and the membrane is arranged at one end of the cylindrical portion, generally perpendicular to the longitudinal axis and in a leak-proof manner with respect to the cylindrical portion.

7. The insert according to claim 1, wherein the insert comprises:
    a flange at the end of the hollow portion opposite the membrane.

8. The insert according to claim 1, wherein the membrane is formed of a shape memory alloy.

9. The insert according to claim 1, wherein the membrane is formed of a polymer.

10. The insert according to claim 1, wherein the outer surface of the membrane is flush with the inner surface of the wall.

11. The insert according to claim 1, further comprising:
    a layer of abradable material disposed on the inner surface of the wall adjacent the outer surface of the membrane.

12. The insert according to claim 1, wherein the hollow portion has a longitudinal axis that is approximately perpendicular to inner surface of the wall.

13. A turbomachine, comprising:
    a wall having an inner surface for defining a fluid stream;
    a leakage channel operably associated with the wall;
    a plurality of apertures passing through the wall, the apertures placing the leakage channel in fluid communication with the fluid stream;
    an insert disposed in each aperture, each insert comprising:
        a hollow portion configured for insertion through the aperture; and
        a membrane disposed at one end of the hollow portion, the membrane comprising:
            an outer surface that, along with the inner surface of the wall, defines the fluid stream;
            an inner surface that is in communication with the leakage channel; and
            at least one notch;
        wherein the membrane is configured so as to deform in the vicinity of the notch in the presence of a pressure difference between the outer surface of the membrane and the inner surface of the membrane.

14. The turbomachine according to claim 13, wherein the apertures are selectively arranged about a circumference of the wall.

15. The turbomachine according to claim 13, wherein the wall defines a stator wall of a compressor, delimiting the outer envelope of the fluid stream accelerated by a row of rotor blades of the compressor, and inserts are arranged so as to face the ends of the row of rotor blades.

16. The turbomachine according to claim 13, wherein the wall is an inner cylinder of a row of stator blades of a compressor, said row of stator blades being a rectifier stage.

17. A multi-stage compressor of a double-flow turbomachine, comprising:
    a first wall for delimiting an outer envelope of a fluid stream of a primary flow passing through the compressor;

a second wall for delimiting an inner envelope of a fluid stream of a secondary flow passing through the compressor, the first wall and the second wall forming a separation beak for separating the primary flow and the secondary flow; and at least one leakage device operably associated with the first wall, the leakage device being an insert disposed at a compression stage of the compressor and comprising
  a hollow portion inserted through an aperture in the first wall; and
  a membrane disposed at one end of the hollow portion, the membrane comprising:
    an outer surface that, along with the inner surface of the first wall, defines the fluid stream;
    an inner surface that is in communication with the leakage channel; and
    at least one notch;
  wherein the membrane is configured so as to deform in the vicinity of the notch in the presence of a pressure difference between the outer surface of the membrane and the inner surface of the membrane;
wherein the separation beak forms a communication chamber in fluid communication with the leakage device; and
wherein the leakage device is adapted to restrict a surging phenomenon.

18. The multi-stage compressor of a double-flow turbomachine according to claim 17, further comprising:
  at least one leakage device operably associated with the second wall for compensating for pressure present in the communication chamber.

19. The multi-stage compressor of a double-flow turbomachine according to claim 18, wherein each leakage device comprises:
  a hollow portion configured for insertion through apertures in the corresponding wall;
  a membrane disposed at one end of the hollow portion; and
  at least one deformable notch formed in the membrane.

20. Method of diminishing and suppressing a surging phenomenon in an axial compressor of a double-flow turbomachine, comprising:
  providing a first wall for delimiting the outer envelope of a fluid stream of a primary flow passing through the compressor;
  providing a second wall for delimiting an inner envelope of a fluid stream of a secondary flow passing through the compressor;
  forming a separation beak for separating the primary flow and the secondary flow with the first wall and the second wall;
  disposing at least one leakage device in the first wall, the leakage device being an insert with
    a hollow portion inserted through an aperture in the first wall; and
    a membrane disposed at one end of the hollow portion, the membrane comprising:
      an outer surface that, along with the inner surface of the first wall, defines the fluid stream;
      an inner surface that is in communication with the leakage channel; and
      at least one notch;
    wherein the membrane is configured so as to deform in the vicinity of the notch in the presence of a pressure difference between the outer surface of the membrane and the inner surface of the membrane;
  disposing at least one leakage device in the second wall; and
  using the separation beak as a communication and compensation chamber for the at least one leakage device disposed in the first wall.

* * * * *